Figure 2:
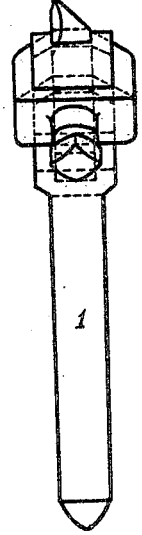

Dec. 26, 1922.

C. R. VICKERS.
TOOL HOLDER.
FILED MAR. 9, 1921.

1,439,985.

WITNESSES
H. J. Hurd.
J. K. Wilson

INVENTOR
Clarence R. Vickers

Patented Dec. 26, 1922.

1,439,985

UNITED STATES PATENT OFFICE.

CLARENCE R. VICKERS, OF PLAINFIELD, NEW JERSEY.

TOOL HOLDER.

Application filed March 9, 1921. Serial No. 451,077.

*To all whom it may concern:*

Be it known that I, CLARENCE R. VICKERS, a citizen of the United States, and a resident of Plainfield, county of Union, State of New Jersey, have invented an Improvement in Tool Holders, of which the following description, in connection with the accompanying drawing, is a specification, like characters on the drawing representing like parts.

This invention relates to cutting tools for turning-lathes, planers and other similar machines using tool-holders which are so constructed with relation to the blades as to insure rigidity of the latter when supported in the tool post of a lathe, planer or similar machine, and the objects in view are to rigidly support the cutting blade in the tool-holder against the component pressures on the blade when cutting any material in the lathe; to provide a tool adapted to cut close to shoulders or chuck jaws, and to provide a construction and arrangement adapted to keep the cuttings from the joints between the connected parts; also to provide a right or a left hand cutting tool by inverting the tool-holder and blade within the tool-holder.

Further objects and advantages of this invention will appear in the following description and the novel features will be particularly pointed out in the appended claims.

Figure 1:
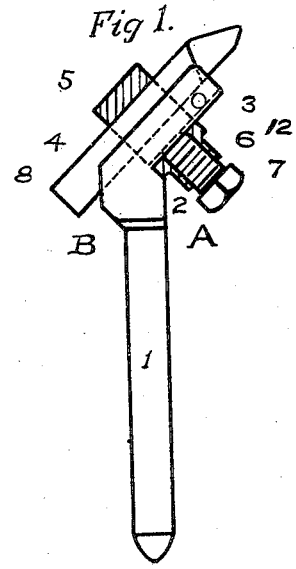
Figure 3:
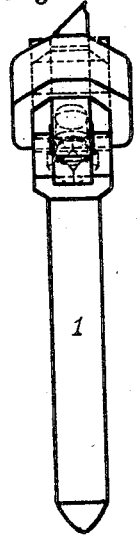
Figure 4:
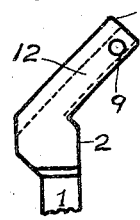
Figure 5:
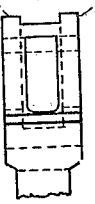
Figure 6:
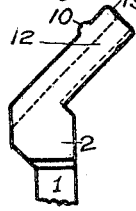
Figure 7:
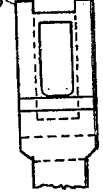
Figure 8:
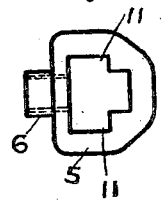
Figure 9:
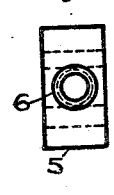

In the accompanying drawings; Figure 1 is a plan view of the tool-holder and blade. Figure 2 is a side elevation of the tool-holder and its blade looking from its side A. Figure 3 is a side elevation of the tool-holder and its blade looking from the side B. Figure 4 is a partial plan view of the tool-holder. Figure 5 is a partial side elevation of the same showing the channels for the blade and also for the end of the clamp screw. Figure 6 is a partial plan view of the tool-holder showing a lug to keep the clamp in its place and also showing with dotted lines the channels for the blade, also for the end of the clamp screw. Figure 7 is a partial end elevation of Figure 6. Figure 8 is an end elevation of the binding collar. Figure 9 is a side elevation of the same.

Similar numerals of reference indicate corresponding parts in all the figures of the drawings.

The tool-holder embodying my invention comprises a shank 1 adapted to be engaged with a tool post of a lathe, planer, or similar machine and with an enlarged end 2 having a parallel groove 4 latterally to partially receive the cutting tool 8, also on the opposite side a similar groove 3 to receive the end of a set screw 7, threaded into the lug 6 on the binding collar 5; a binding collar 5 cut or mortised to receive the enlarged end 2 of the shank and also cut to receive a portion of the blade 8 and a set screw 7 to clamp the blade to the enlarged portion of the shank.

A hole 9 shown in Figs. 4 and 5 may be drilled through the end of the tool-holder to insert a cotter or other pin to keep the binding collar and shank together when the blade is removed, or a lug 10, shown in Figs. 6 and 7 may be substituted.

The tool and seat for same are shown preferably angular to the shank, but may be made parallel if so desired and also offset.

The means I employ for securing the blade in its place in the groove, or its seat provided in the enlarged end of the shank, consists of a binding collar 5 mortised out to receive the enlarged portion of the shank 2 and also of the blade 8 and so as to have a small amount of clearance between the shouldered portions 11—11 in the binding collar 5 and width 12 of shank and having a set screw in said collar to draw the said blade rigidly against the bottom of said groove in the shank.

It is obvious that partially seating the cutting tool between the lips 13—13 of the groove 4 and binding the said cutting tool with the binding collar and its set screw a very rigid construction is obtained.

What I claim is:—

1. In a tool-holder, the combination with a shank, one end of which is enlarged, having a channel in said enlarged end for holding a cutting tool against vertical movement, a second groove on the opposite side of the enlarged end to receive the point of a set screw, a cutting tool, a collar surrounding said tool-holder and the said tool, a set screw threaded in the said collar, the point of which rests in the bottom of the second said groove.

2. In a tool-holder, the combination with a shank, one end of which is enlarged, the said enlarged end having a groove in one side, and running laterally, to support a cutting tool and a groove in the opposite side to form a seat for the end of a set screw, a hole near the extremity of said enlarged end, and a pin protruding from said hole.

In testimony whereof I have affixed my signature.

CLARENCE R. VICKERS.